United States Patent

[11] 3,610,420

[72] Inventors Ronald N. Sampson
 Monroeville;
 Jacob Chottiner, McKeesport; Edward M. Petrie, Pittsburgh, all of Pa.
[21] Appl. No. 740,184
[22] Filed June 26, 1968
[45] Patented Oct. 5, 1971
[73] Assignee Westinghouse Electric Corporation
 Pittsburgh, Pa.

[54] POROUS SUPPORT TUBES FOR REVERSE OSMOSIS
 2 Claims, 4 Drawing Figs.
[52] U.S. Cl. .................................................. 210/490
[51] Int. Cl. ...................................................... B01d 31/00,
 B01d 13/00
[50] Field of Search......................................... 138/124,
 125, 130, 177; 210/23, 321, 433, 490, 500, 508,
 509, 989

[56] References Cited
UNITED STATES PATENTS

| | | | |
|---|---|---|---|
| 2,168,366 | 8/1939 | Slayter | 138/DIG. 2 |
| 2,517,753 | 8/1950 | Ximenez | 138/DIG. 2 |
| 2,977,839 | 4/1961 | Koch | 138/125 X |
| 3,457,171 | 7/1969 | Flowers | 138/125 X |
| 2,539,768 | 1/1951 | Anderson | 210/496 |
| 3,398,837 | 8/1968 | Adams | 210/508 X |

OTHER REFERENCES

" Morgan, Jr., et al., Reverse Osmosis" from Food Technology, 1965, vol. 19, No. 12, pp. 52– 54.

Primary Examiner—Frank A. Spear, Jr.
Attorneys—F. Shapoe and Alex Mich, Jr.

ABSTRACT: A fiber glass filament-wound porous tube for use in a reverse osmosis water purification system is made from multiple layers of resin impregnated continuous glass roving. These tubes are fabricated either by an open weave helical filament winding technique or by adding to the impregnating resin certain amounts of blowing agent having a decomposition temperature slightly below or above the resin cure temperature.

PATENTED OCT 5 1971  3,610,420

3,610,420

POROUS SUPPORT TUBES FOR REVERSE OSMOSIS

BACKGROUND OF THE INVENTION

This invention relates to porous hollow vessels and to methods of manufacturing them. More particularly, this invention relates to resin bonded filament-wound tubes with purposely induced voids or interconnected cells to serve as support tubes for cellulose acetate or other suitable reverse osmosis membranes.

The major advantage of reverse osmosis as a saline water conversion process is the low-energy requirement as compared to other processes. The function of a desalination cell for the reverse osmosis process is to bring a saline solution at high pressure in contact with a supported semipermeable membrane. Several methods accomplish this technical requirement satisfactorily. These can be classified primarily by the configuration of the membrane in use. The two different configurations that have been considered are tubular and flat plates.

There are several metals and metal combinations which can be used for the tubular membrane support and pressure containing components in a reverse osmosis system. The most promising of the metals so far considered are clad carbon steels with alloys of copper and nickel or stainless steels as the cladding material. These components could easily conform to the 800 p.s.i. to 1500 p.s.i. pressure requirements of such a system but the initial material cost of such a system is quite high. Such components must be drilled with many holes to permit the pure water to be removed from a saturable medium, such as a fabric that is wound around the membrane forming a sump between the pipe and the membrane. This adds to fabrication costs.

Filament-wound fiber glass tubes have exceptionally high tensile strength and are highly resistant to corrosion. They also cost much less than stainless steel products or the more sophisticated cladded pipes described above. Such fiber glass components have been used in reverse osmosis pilot plant operations for several years and have been proved successful in this area.

SUMMARY OF THE INVENTION

Briefly, the present invention may be stated generally as a resin impregnated and bonded multiple layer filament-wound plastic pipe that is made porous throughout its length by new and improved means. This result can be accomplished either by introducing into the liquid resin impregnating composition an inorganic or an organic blowing agent which by decomposing and/or forming a gas at or about the curing temperature of the resin results in a porous structure or by weaving openings into the pipe during the winding process. A porous sump consisting of a polyethylene terephthalate- cotton composite film may also be used wherein holes would be drilled in the plastic pipe to permit egress of water.

Accordingly, it is the object of this invention to provide new and improved resin impregnated filament-wound porous support tubes for use in reverse osmosis processes.

Another object of this invention is to provide new and improved methods of fabricating filament-wound plastic pipe having a porous wall structure.

BRIEF DESCRIPTION OF THE DRAWINGS

For a better understanding of the nature and objects of the invention, reference may be had to the following drawings, in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process. A detailed analysis of this phenomenon can be found in U. Merten, *Desalination by Reverse Osmosis* (M.I.T. Press, 1966).

Figure 1:
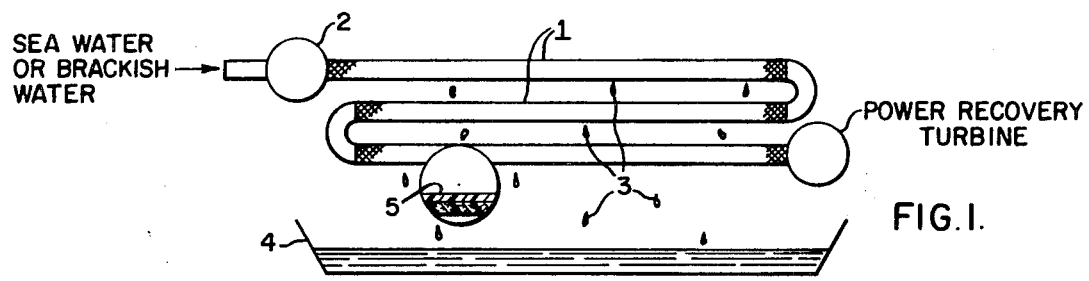
FIG. 1 is an elevation partly in magnified section extraction of fresh water from sea or brackish water by reverse osmosis through tubular membranes and porous support tubes

FIG. 1 illustrates a typical tubular reverse osmosis system. Sea water or brackish water can be pumped through a battery of the support tubes 1 of this invention. The pump 2 must exert a pressure of at least 400 p.s.i. and generally will operate between 800 p.s.i. to 1,500 p.s.i. The tubes can be mounted in batteries of about 150 each. They serve to support the membrane 5 contained within them which is usually made of aqueous magnesium perchlorate and acetone modified cellulose acetate having, for example, an acetyl content of 39.8 percent by weight. Such membranes will last about 6 months in operation, are selected because of their favorable transport characteristics and ready solubility in suitable casting solvents, and can be used in conjunction with the support tubes of this invention. Other membranes that are particularly suitable as membranes with the support tubes of this invention are those made of graphitic oxide as disclosed by Flowers and Berg in U.S. application, Ser. No. 615,837 now Pat. No. 3,457,171, assigned to the assignee of this invention and filed on Feb. 13, 1967.

The tubes 1 that support the membranes 5 must be able to withstand the pressure exerted on them by the pump and must be made porous in some manner to allow egress of the pure water 3 into a collecting pan 4. For sea water several passes through a system of this type may be required before the water is usable.

Figure 2:
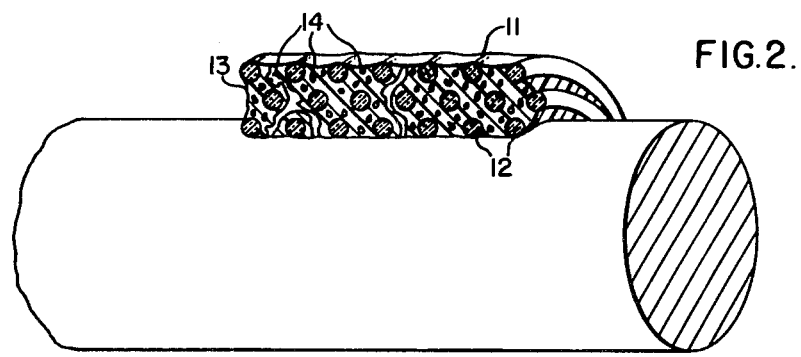
FIG. 2 is a fragmentary perspective view partially in cross section of a filament winding roving band used in one embodiment of this invention.
Figure 3:
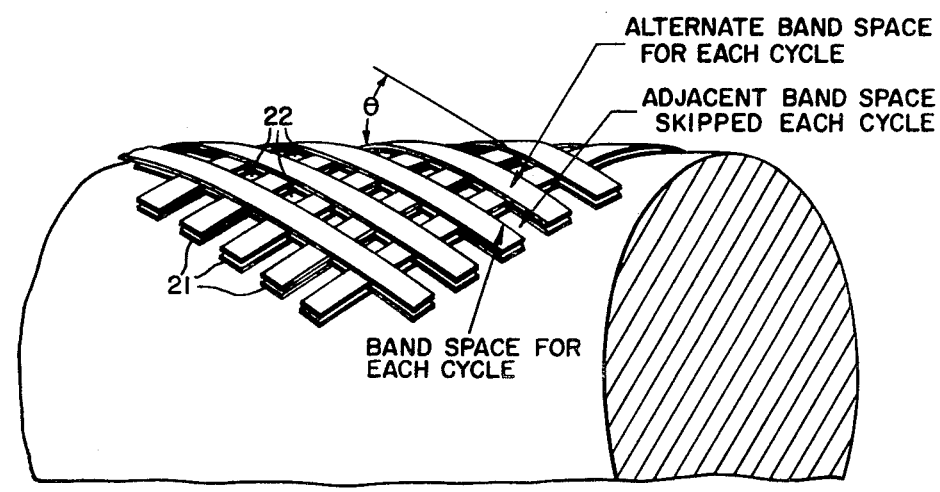
FIG. 3 is a fragmentary perspective view partially in cross section of a support tube in accordance with another embodiment of this invention.
Figure 4:
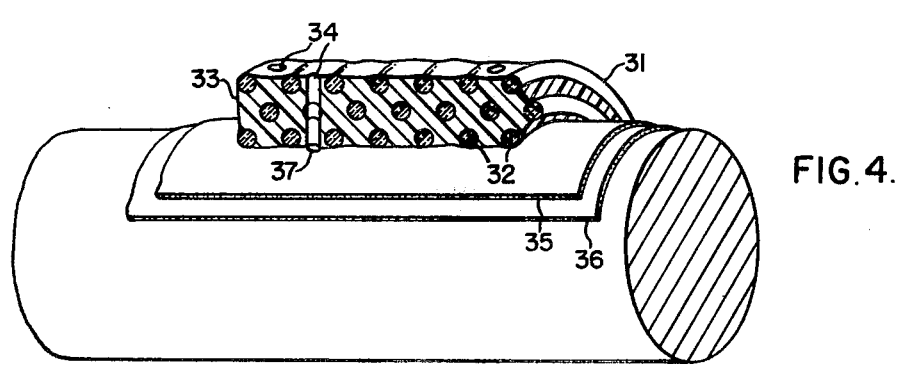
FIG. 4 is a fragmentary perspective view partially in cross section of another embodiment of this invention.

FIGS. 2, 3 and 4 show three preferred embodiments of this invention. They show three filament-wound tube designs useful in reverse osmosis systems.

Filament winding is a process by which strands of materials (threads of spun glass or other fibers) are wound helically or circumferentially on a form or mandrel in a continuous web and shaped into suitable cylindrical tubes or vessels. The strands and/or web are coated or impregnated with a liquid thermosetting resinous binder that can be cured to form a rigidly bonded structure. The cured solidified resin binds together the fibers of each layer as well as those of various superposed layers of winding bands and ordinarily fills any interstices that may exist between any of those windings or layers. Thus the structure is primarily one of fibrous material with the quantity of settable binder being kept to a minimum, rather than a structure involving merely the reinforcement of a resinous body by the use of fibers. The resin or matrix component also acts to distribute stresses on the structure to the fiber reinforcement. As a result one gets a vessel of great strength with low weight and maximum resistance to deterioration. Filament winding is a well-known pipe fabrication technique and reference may be had to several recent patents, U.S. Pat. Nos. 3,083,864 and 3,331,722, for more detailed information concerning it.

The filament-wound tubes of this invention differ from those generally used in that they have been deliberately made with voids or pores so as to allow water under pressure to leak through them. Glass is the presently preferred filamentary material since it gives a highly rigid structure but this invention is not so limited as other fibrous materials having sufficient strength may be employed in place of glass.

The use of unsaturated styrenated polyesters as the resinous binder is described hereinbelow but it should be understood that other thermosetting resins such as glycidyl polyether (epoxy) resins can be used. Unsaturated polyesters are used principally in combination with fibrous reinforcement for the fabrication of a wide variety of articles. By themselves, polyester resins do not possess good strength properties, but in combination with reinforcing fibers they can be suitable for use as structural materials.

The reaction between an acid and an alcohol produces an ester and water. By using difunctional alcohols and dibasic acids, esterification reactions may take place at each reactive site to form linear polymers such as:

—P —G —M —G —P —where G = glycol, M = maleic anhydride (or other unsaturated dibasic acid) and P = phthalic (or other saturated) dibasic acid moieties. This polyester contains unsaturation in the maleic moieties and, normally, such unsaturation will not tend to react by itself. If, however, an unsaturated monomeric material is introduced, this can react with the maleic unsaturation and result in cross-linking of the linear polyester into a complex, three dimensional polyester which may then be represented as follows:

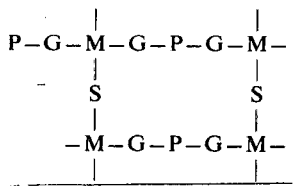

where S represents a styrene moiety or the moiety from other cross-linking monomers.

FIG. 2 shows a cross section of a resin impregnated glass filament winding roving on a mandrel. This figure shows one embodiment of this invention wherein the winding band 11 is composed of a plurality of glass or other fibers 12 impregnated with a resin 13. After the curing step, the resin which fills the interstices between the glass fibers contains a large number of interconnected gas pockets 14 giving the appearance of a foam. This network of interconnected gas pockets or cells results in a porous structure in the resin matrix wherein water under pressure can leak or seep out of a tube formed from windings of these bands. The porosity is obtained by introducing into the liquid resin an inorganic or organic blowing agent which vaporizes in the former case or decomposes in the latter thereby forming gas during the polymerization step. Any blowing agent such as sulfonyl hydrazides, N-Nitroso-compounds, Azo-compounds or bicarbonate of soda can be used so long as they decompose during the resin curing step. Solvents such as acetone can also be used as the blowing agent to form the gas pockets as long as they boil at the curing temperature. There are of course limits on the amount of blowing agent used. Porosity should not be obtained at the expense of structural strength. For the resin-catalyst systems used in the experiments described hereinafter, a range of 2 –25 weight percent of blowing agent was established.

The gas pockets themselves are evenly distributed throughout the resin matrix, are of varying minute diameter and tend to increase in size and become more numerous as they approach the outside of the support tube. They may vary in size from about a 0.01 to 10-mil diameter. This larger value can arise when several gas pockets merge into one. If too many gas pockets are this large the structure of the tube will be weakened.

FIG. 3 shows a three-dimensional view of another embodiment of this invention wherein porosity in the support tube is obtained by causing the filament winding bands 21 to lay exactly on top of each other rather than side by side as is the usual practice in filament winding processes. This requires alternate skipping of band spaces on the first cycle of the filament winding machine and requires each successive band cycle to exactly cover the previously laid band. The product is similar in appearance to a woven basket or fabric having diamond-shaped openings or voids. In the actual product the voids 22 would be small so that the tube could withstand the required pressures. They would be about one-sixteenth of an inch rough diameter i.e., a 1/ 16-inch-diameter circle could be inscribed within the diamond shaped voids. The tapes would be composed of fibers impregnated with a resin not containing a solvent or blowing agent. This method would require quality control because the more layers forming the tube wall the greater the chance of inexact overlap of tapes and consequent covering of the voids. Angle θ shows the angle that the tape is laid against the mandrel.

FIG. 4 shows another embodiment of this invention wherein the winding tape or band 31 is composed of a plurality of glass or other fibers 32 impregnated with a resin 33. Holes 34 are drilled to allow egress of water through the wall. These holes continue through the layer of polyethylene terephthalate 35 as shown at point 37. A bottom cotton layer 36 is also shown. The composite film could also be polyethylene terephthalate with other natural or synthetic fiber fabric to provide combinations that are bondable to the resin matrix, able to withstand the temperature of cure and possess suitable water saturability without being saturated by the resin during the winding process.

EXAMPLE 1

A filament-wound porous plastic pipe was made having an outside diameter of 0.75 inches, a wall thickness of 0.187 inches after curing and length of 24 inches. It was made from resin impregnated filament winding bands of 15 end roving, 0.4 inches wide, of type E glass fibers having individual diameters of $50 \times 10^{15}$ inches.

The impregnating resin used contained 100 parts by weight of an unsaturated styrenated polyester resin formed by the reaction of phthalic and maleic anhydride with propylene gylcol. A suitable resin is commercially available under the trademark Marco 36–C from W. R. Grace & Co. It has a viscosity of 500–700 c.p.s. and contains 38–40 percent styrene. To this resin was added 2 parts by weight of 50 percent benzoyol peroxide in tricresyl phosphate as catalyst and 5 parts by weight (4.6 weight percent) of a nitrogen releasing blowing agent containing 70 percent N,N'-dimethyl-N,N'-dinitroso-terephthalamide (NTA) and 30 percent white mineral oil by weight with a decomposition temperature of about 90°–105° C. The glass filament roving was continuously passed through this impregnating resin prior to being wound on the mandrel.

The resin matrix impregnated glass band having a glass-resin weight ratio of about 75: 25 (about 75 weight percent of glass) was wound at 20 r.p.m. onto a mandrel using 12 circuits of a McLean-Anderson W–1 filament winding machine The wind angle used was 60° giving an intermeshed helical winding of closed webbing wherein the roving bands were wound adjacent to each other. The pipe was cured while rotating at 105° C. for 3 hours during which time the resin cured and the blowing agent decomposed and formed a gas filling the resin matrix with a multitude of interconnected cells or gas pockets. This caused an increase in wall thickness from 1/8 inch to 3/ 16 inch and gave the resin matrix the appearance of a foam. It was critical that the blowing agent decompose slightly below to slightly above the cure temperature of the resin otherwise very little porosity will be obtained in the tubes. The finished tube was then taken off the mandrel by applied pressure. To test for porosity, one end of the tube was plugged and the inside was pressurized with water at 60 p.s.i. The tube immediately began to weep freely. In fact the tube was weeping even before pressure was applied.

The maximum hoop strength of this porous tube was estimated to be in excess of about 40,000 p.s.i. This is the pressure at which a cross section of the vessel would pull apart. The limits on the blowing agent are from about 2 to 25 weight percent. Below this range porosity suffers and above this range the strength of the tube suffers because the large number of cells formed causes the resin to crumble. Other blowing agents that could have been used include Azo-bisisobutyronitrile and benzinesulfonylhydroxide. Both have decomposition temperatures of about 95° C. and so would cause a porous structure during the curing step described above. It was found that by letting the impregnating resin sit for awhile before the glass rovings are passed through it causes the larger grains of blowing agent to settle to the bottom. This causes a finer more evenly dispersed resin foam after curing.

EXAMPLE 2

A filament wound plastic pipe was made using the same glass band and having the same dimensions as in example 1 except that wall thickness was 0.125 inches. The resin impregnant was the same as in example 1 except that no blowing agent was used. The pipe winding mandrel was first wrapped with a composite film consisting of cotton cloth 4.7-mils thick laminated to polyethylene terephthalate film 5 mils thick. This composite was placed on the mandrel with the cotton layer next to the mandrel. The impregnated glass roving having the same glass-resin ratios as example 1 was then wound onto the composite surface. The winding and curing conditions were similar to those described in experiment 1 except that mandrel speed was increased to 40 r.p.m. After the pipe was cured, holes were drilled through the walls and the polyethylene terephthalate composite film with a number 55 drill (0.051-inch diameter) every 90° around the circumference on 2-inch centers. The rows of holes were offset one-half inch from each other.

The purpose of the polyethylene terephthalate film was to prevent the resin from saturating the cotton layer and to present a bondable surface to the resin. The cotton layer served as a sump. When pressurized with water at 60 p.s.i., water was seen to flow freely from the holes. The hoop strength of this tube was estimated to be in excess of 40,000 p.s.i.

EXAMPLE 3

Suitable gears were installed in the filament winding machine to give an "open-winding" pattern. Another method of providing a reverse osmosis tube was to actually wind an open weave type of wall structure. The water would pass through the open "diamond" voids contained in the filament-wound tube. During this winding operation, the impregnated glass bands are not laid down adjacent to each other as in the first two examples but rather on top of each other as shown in FIG. 3 of the drawings. The first cycle lays roving in alternate band spaces, i.e., every other of the series of band spaces. Each successive cycle exactly covered the previously laid band. This gave intermeshed helical open webbing layers.

The impregnated resin used was the same as in example 2 and the glass and tube dimensions were the same as in example 1 except that wall thickness varied from zero, where there was a void in the wall, to 0.125 inch. The resin was cured for 2 hours at 60° C. and then 2 hours at 90° C.

The impregnated filament winding tapes had a glass-resin ratio of about 75: 20 (about 75 weight percent glass) and were wound for 7 cycles on the mandrel at 70 r.p.m. The wind angle, the angle the bands were laid against the mandrel, $\theta$ in FIG. 3, was 60° although it was found that angles from 15° to 75° would still give open weaving. The bands were spaced 2 inches apart. The resulting product had a rough intermeshed helical wall surface. In a 14-inch section of pipe approximately 6 natural holes of about 1/16-inch diameter were developed i.e., a 1/16-inch-diameter circle could be inscribed within the diamond shaped void. However if the wind was theoretically perfect, with each tape band exactly on top of the previously laid tape band and no excess resin was allowed to fill up the open diamonds, there would be about 26 openings, or about one void per square inch, having larger diameters. At 60 p.s.i., water was observed to flow from the openings in the tube. The hoop strength was estimated to be in excess of about 40,000 p.s.i.

In this example, the bands overlapped about 1/16 inch per cycle rather than remaining exactly on top of the previously laid band. With better control the bands could be spaced 1/32 to 1/8 inch apart and still get about one void per square inch of an approximate diameter of about 1/32 to 1/16 inch. Also, the bands could be preimpregnated and then heated on the mandrel so that excess resin would not tend to fill up the voids as when the bands are passed through the resin prior to winding on the mandrel.

While there have been shown and described what are at present considered to be the preferred embodiments of this invention modifications thereto will readily occur to those skilled in the art. It is not desired therefore that the invention be limited to the embodiment and methods shown and described and it is intended to cover in the appended claims all such modifications as fall within the true spirit and scope of the invention.

What we claim is:

1. A porous, filament wound, hollow reverse osmosis tube having a wall comprising multiple layers of resin impregnated filament bands and a semipermeable membrane selected from the group consisting of graphitic oxide and modified cellulose acetate supported by the inside tube wall, said bands comprising roving bands laid at an angle between 15° and 75° to provide about one diamond-shaped void per square inch of tube surface area, said bands forming intermeshed helical opening webbing layers, the bands of each layer being spaced between about 1/32 to 2 inches apart, each band of a successive layer lying directly over a band of the prior similarly aligned layer.

2. The tube of claim 1 wherein the diamond shaped voids are such that a 1132- to 1/16-inch diameter circle could be inscribed within them.

UNITED STATES PATENT OFFICE
CERTIFICATE OF CORRECTION

Patent No. 3,610,420          Dated October 5, 1971

Inventor(s) Ronald N. Sampson et al

It is certified that error appears in the above-identified patent and that said Letters Patent are hereby corrected as shown below:

Claim 2, column 6, line 56, "1132-" should read -- 1/32 --.

Signed and sealed this 29th day of October 1974.

(SEAL)
Attest:

McCOY M. GIBSON JR.　　　　　　　　　C. MARSHALL DANN
Attesting Officer　　　　　　　　　　Commissioner of patents